(12) United States Patent
Totzeck et al.

(10) Patent No.: US 11,279,104 B2
(45) Date of Patent: Mar. 22, 2022

(54) REFRACTIVE OPTICAL COMPONENT AND SPECTACLE LENS PRODUCED THEREFROM, METHOD FOR PRODUCING A REFRACTIVE OPTICAL COMPONENT, COMPUTER PROGRAM PRODUCT, CONSTRUCTION DATA OF A SPECTACLE LENS STORED ON A DATA MEDIUM, DEVICE FOR ADDITIVE

(71) Applicants: Carl Zeiss AG, Oberkochen (DE); Carl Zeiss Vision International GmbH, Aalen (DE)

(72) Inventors: Michael Totzeck, Schwäbisch Gmünd (DE); Markus Haidl, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 17/398,435

(22) Filed: Aug. 10, 2021

(65) Prior Publication Data
US 2021/0362444 A1 Nov. 25, 2021

Related U.S. Application Data

(63) Continuation of application No. PCT/EP2020/053967, filed on Feb. 14, 2020.

(30) Foreign Application Priority Data

Feb. 14, 2019 (EP) ..................... 19157212

(51) Int. Cl.
*G02B 1/10* (2015.01)
*B29D 11/00* (2006.01)
(Continued)

(52) U.S. Cl.
CPC ........ *B29D 11/00355* (2013.01); *B33Y 30/00* (2014.12); *G02B 1/11* (2013.01);
(Continued)

(58) Field of Classification Search
CPC ........ B33Y 30/00; G02B 3/0087; G02B 1/11; G02B 1/10; G02C 7/061; G02C 2202/12;
(Continued)

(56) References Cited

U.S. PATENT DOCUMENTS 6,613,421 B2 * 9/2003 Jonza .................. G02B 5/3083
428/212
6,635,337 B2 * 10/2003 Jonza ..................... B29D 11/00
428/212

(Continued)

FOREIGN PATENT DOCUMENTS

DE 10113466 C1 11/2002
DE 102009004380 B4 4/2012
(Continued)

OTHER PUBLICATIONS

International Preliminary Examination Report issued in PCT/EP2020/053967, which is a counterpart hereof, dated Jul. 7, 2021, and English-language translation thereof.
(Continued)

*Primary Examiner* — William R Alexander
(74) *Attorney, Agent, or Firm* — Thrive IP®; Georg M. Hasselmann

(57) ABSTRACT

A refractive optical component has a main body with a plurality m of optical layers extending between a front side and a back side, each layer having a thickness, wherein each of the layers extends over a region common to all layers, the common region being greater than the maximum thickness of the respective layer by at least a factor of 10, wherein the thickness of the layers varies over the extent thereof trans-
(Continued)

versely to the principal axis, and wherein the main body has a refractive index curve (n=n(x, y, z)), modulated at least in the direction parallel to the principal axis, with a plurality of maxima and minima, a distance between adjacent maxima and minima ranging between 0.5 μm and 100 μm and a refractive index difference Δn between adjacent maxima and minima ranging between $10^{-4}$ and 0.3.

15 Claims, 2 Drawing Sheets

(51) Int. Cl.
 *B33Y 30/00* (2015.01)
 *G02B 1/11* (2015.01)
 *G02C 7/06* (2006.01)
 *G02B 3/00* (2006.01)

(52) U.S. Cl.
 CPC ............ *G02B 3/0087* (2013.01); *G02C 7/061* (2013.01); *G02C 2202/12* (2013.01)

(58) Field of Classification Search
 CPC ........ B29D 11/00355; B29D 11/00009; B29D 11/00
 USPC .......................................................... 359/652
 See application file for complete search history.

(56) References Cited

U.S. PATENT DOCUMENTS

| | | | | |
|---|---|---|---|---|
| 10,442,146 | B2* | 10/2019 | Gourraud | ............... B33Y 30/00 |
| 10,459,247 | B2* | 10/2019 | Anatole | ............... B29C 64/124 |
| 2005/0046957 | A1 | 3/2005 | Lai et al. | |
| 2010/0110132 | A1 | 5/2010 | Smith | |
| 2015/0153589 | A1 | 6/2015 | Meschenmoser et al. | |
| 2017/0192130 | A1* | 7/2017 | Liu | ...................... B29C 48/185 |
| 2019/0101763 | A1* | 4/2019 | Ihmels | ............... G02B 27/0176 |
| 2019/0179169 | A1* | 6/2019 | Clerc | ................. B29D 11/0073 |
| 2019/0219739 | A1* | 7/2019 | Gregorski | ........... C03C 17/3452 |
| 2019/0324289 | A1* | 10/2019 | Gloge | .................... G02B 1/041 |
| 2020/0217989 | A1* | 7/2020 | Wold | ..................... B42D 25/23 |

FOREIGN PATENT DOCUMENTS

| | | |
|---|---|---|
| DE | 102009004377 B4 | 9/2016 |
| DE | 102009004379 B4 | 9/2016 |
| EP | 341998 A1 | 11/1989 |
| WO | 2008051578 A2 | 5/2008 |
| WO | 2008051592 A2 | 5/2008 |
| WO | 2015092014 A1 | 6/2015 |
| WO | 2015092016 A1 | 6/2015 |
| WO | 2016188930 A1 | 12/2016 |

OTHER PUBLICATIONS

Industrial Norm DIN 52314 entitled "Bestimmung des spannungsoptischen Koeffizienten im Zugversuch [Tensile test for the determination of stress optical coefficient]," published Nov. 1977, and English-language translation thereof.

Ying et al. "An improved transmitting multi-layer thin film filter," Chin. Phys. B vol. 24, No. 5 (2005).

Imenes et al. "Flat-topped broadband rugate filters," Applied Optics, vol. 45, No. 30, pp. 7841 to 7850, Oct. 20, 2006.

Peters et al. "Design of photonic structures for the enhancement of the light guiding efficiency of fluorescent concentrators," Proc SPIE 7002, Photonics for Solar Energy Systems II, Strasbourg, France May 5, 2008.

European Search Report issued in EP 19157212.2, which is a counterpart hereof, completed Jul. 24, 2019.

International Search Report issued in PCT/EP2020/053967, which is a counterpart hereof, dated Apr. 30, 2020, and English-language translation thereof.

Written Opinion issued in PCT/EP2020/053967, which is a counterpart hereof, dated Apr. 30, 2020.

* cited by examiner

REFRACTIVE OPTICAL COMPONENT AND SPECTACLE LENS PRODUCED THEREFROM, METHOD FOR PRODUCING A REFRACTIVE OPTICAL COMPONENT, COMPUTER PROGRAM PRODUCT, CONSTRUCTION DATA OF A SPECTACLE LENS STORED ON A DATA MEDIUM, DEVICE FOR ADDITIVE

CROSS REFERENCE TO RELATED APPLICATIONS

This application is a continuation application of international patent application PCT/EP2020/053967, filed Feb. 14, 2020, designating the United States and claiming priority from European application EP 19157212.2, filed Feb. 14, 2019, and the entire content of both applications is incorporated herein by reference.

TECHNICAL FIELD

The disclosure relates to a refractive optical component. In addition, the disclosure relates to a spectacle lens produced therefrom. Furthermore, the disclosure relates to a method for producing a refractive optical component and to a spectacle lens produced according to the method. Finally, the disclosure relates to a computer program product for carrying out a method for producing a refractive optical component, a device for additive manufacturing of a main body, and a spectacle lens, and also construction data of a corresponding main body stored on a data medium.

BACKGROUND

It is possible to produce optical components by additive manufacturing methods. By way of example, reference should be made in this respect to WO 2015/092016 A1, US 2005/0046957 A1, and WO 2016/188930 A1. In this case, the dictates of production may result in undesired effects, for example scattering effects, which adversely affect the optical properties of the components.

EP 0341998 A1 discloses a multifocal lens. WO 2008/051578 A2 and WO 2008/051592 A2 disclose multilayered lenses. DE 102009004377 B4, DE 102009004379 B4, and DE 102009004380 B4 disclose methods for producing a spectacle lens by means of an additive manufacturing method. These patents disclose in particular the production of a spectacle lens layer by layer.

SUMMARY

It is an object of the disclosure to improve a refractive optical component.

It is in particular an object of the disclosure to form a refractive optical component having improved scattering properties. It is an object of the disclosure in particular to form the refractive optical component in such a way that the arising of scattered light is reduced, more particularly prevented.

This object is achieved with a refractive optical component having a main body with a refractive index profile that is modulated at least in a direction parallel to the principal axis.

An aspect of the disclosure entails forming a refractive optical component comprising a main body, wherein the main body has a refractive index profile, modulated along at least a first direction (also referred to hereinafter as principal axis), with a plurality of maximum and minima, wherein the distance between adjacent maxima and minima ranges between 0.5 µm and 100 µm, and wherein a refractive index difference $\Delta n$ between adjacent maxima and minima ranges between $10^{-4}$ and 0.3, wherein the thickness of the layers varies over the extent thereof transversely to the principal axis, and wherein a number of maxima in the refractive index profile within a given layer in directions transversely to the principal axis is less than 20.

It has been found that such a component has particularly advantageous scattering properties.

The layers are aligned transversely to the principal axis. They have in particular interfaces running transversely to the principal axis.

The maximum refractive index difference $\Delta n$ in a direction parallel to the principal axis is commonly at most 0.2, in particular at most 0.1, more particularly at most 0.05, even more particularly at most 0.03, with particularity at most 0.02, with more particularity at most 0.01, with even more particularity at most 0.005, typically at most 0.003, more typically at most 0.002, even more typically at most 0.001. It is possible in particular to strive to minimize a refractive index difference that can arise at the interface between two adjacent layers owing to the dictates of manufacturing.

The number of layers, in particular the number thereof in a direction parallel to the principal axis, is in particular in the range of 5 to 100,000. The number of layers, in particular the number of maxima in the refractive index profile in a direction parallel to the principal axis, is in particular at least 50, more particularly at least 100. It is typically at most 10,000, in particular at most 5,000, more particularly at most 3,000, even more particularly at most 1,000.

The number of the layers is dependent inter alia on the droplet size of the material for producing the layers. The diameter of the droplets of the material for producing the layers can be in particular in the range of 1 µm to 100 µm. Smaller droplets enable the layers to be produced more precisely. Larger droplets can result in a reduction of the time required for manufacturing the main body.

The droplet size can be controlled precisely by way of a piezo pressure, for example. For details, reference should be made for example to US 2010/0110132 A1.

The number of maxima in the refractive index profile within a given layer in directions transversely to the principal axis is typically at most 10, in particular at most 5. It can also be at most 3, in particular at most 2.

The refractive index profile within a given layer can in particular be homogeneous, more particularly have no extrema. Always occurring fluctuations of the refractive indices shall be disregarded here. In particular, fluctuations of the refractive index within a range of three standard deviations around the mean value thereof or fluctuations by up to $\Delta n \leq 10^{-4}$ in volume elements having a side length of 10 µm shall be disregarded.

In addition, the object according to the disclosure is achieved by means of a refractive optical component comprising a main body manufactured in a 3D printing method, which main body extends over a region of at least 1 mm, in particular at least 2 mm, more particularly at least 3 mm, even more particularly at least 5 mm, with particularity at least 10 mm, with more particularity at least 20 mm, with even more particularity at least 30 mm, in directions perpendicular to the principal axis and the thickness of which main body varies over the extent thereof perpendicular to the principal axis, wherein the main body has a refractive index profile in such a way that a number of maxima in directions transversely to the principal axis is less than 20, in particular at most 10, more particularly at most 5, with particularity at most 3, with more particularity at most 2.

The main body has a refractive index profile that is as homogeneous as possible in particular in a direction transversely to the principal axis. It has been found that this is particularly advantageous for the scattering properties of the refractive optical component.

The main body can be manufactured in particular by means of a layer-by-layer 3D printing method, more particularly a multi-jet modelling method (MJM method), or by means of a volumetric additive method.

In accordance with one aspect, the main body comprises a plurality of optical layers. The layers are applied in particular one on top of another. They are defined in particular by the method for manufacturing the main body.

The term layer denotes in particular a region which is applied and/or cured in a common method step. Successive layers are in particular progressively applied one on top of another and cured. A layer can be formed in particular in simply connected fashion. This is not necessarily the case, however.

The main body, in particular the layers, can have curved surfaces and/or interfaces. For details, reference is made to the further description.

In accordance with one aspect of the disclosure, the layers extend over a region common to all the layers in directions perpendicular to the principal axis, the common region also being referred to as optically used region. The region is greater than the maximum thickness of the respective layer by at least a factor of 10. It can be greater than the maximum thickness of the respective layer by a factor of at least 20, in particular at least 30, more particularly at least 50, even more particularly at least 100.

The extent of the main body, in particular of the layers thereof, in a direction perpendicular to the principal axis relates in particular to the extent thereof in the case of perpendicular projection into a plane perpendicular to the principal axis.

In accordance with one aspect of the disclosure, the layers have a thickness in the range of 1 µm to 100 µm. The layers have in particular a thickness in the range of 5 µm to 50 µm. This information can concern the average thickness of the layers or the maximum thickness of the layers.

A smaller thickness of the layers enables the main body to be manufactured particularly flexibly and precisely. A larger thickness of the layers results in a reduction of the time required for manufacturing the main body.

In accordance with a further aspect of the disclosure, the layers each have surface normals which are inclined by at most 67°, in particular at most 45°, more particularly at most 30°, even more particularly at most 15°, relative to the direction of the principal axis. The layers run in particular transversely, apart from a possible curvature, typically perpendicular to the principal axis as much as possible. This, too, is advantageous for the scattering properties of the optical component.

In accordance with a further aspect of the disclosure, the refractive index profile is homogeneous along the front side and/or back side of the main body. The refractive index profile has no extrema in particular in the region of the front side and/or back side.

This is attributable inter alia to the fact that the interfaces between layers adjoining one another do not end on the front side or the back side of the main body. The interfaces between layers adjoining one another are in particular free of overlap with the front side and the back side of the main body. This, too, improves the optical properties of the component.

In accordance with a further aspect of the disclosure, the main body has a maximum thickness of at most 8 mm, in particular at most 6 mm, more particularly at most 5 mm, in a direction parallel to the principal axis and an extent of at least 1 cm, in particular at least 2 cm, more particularly at least 3 cm, in a direction perpendicular to the principal axis. This is advantageous for forming a spectacle lens.

In the case where the layers are formed in curved fashion, the refractive index profile can be modulated in each case exclusively in a direction perpendicular to a front side and/or back side of the layers. Within a layer the refractive index profile has no extrema in a direction transversely, in particular perpendicular, to a local normal to the front side and/or back side of the respective layer. This applies in particular when considering a region which, proceeding from the center of the respective layer relative to a local normal to the front side or back side of the layer in a direction perpendicular to the normal, extends over an extent which is greater than the maximum thickness of the layer. The region without extrema extends in particular over at least 100 µm, more particularly at least 200 µm, even more particularly at least 300 µm, with particularity at least 500 µm, with more particularity at least 1 mm, in a direction perpendicular to the normal. The extrema-free region extends in particular over a length which corresponds to the root of the product of the absolute value of the local radius of curvature and the thickness of the layer.

The refractive index profile $n=n(x,y,z)$ in the main body can be characterized by a three-dimensional Fourier transform $\tilde{n}=(f_x, f_y, f_z)$ with a modulation vector $f=(f_x, f_y, f_z)$. In this case, a normalization-free Fourier transformation shall be assumed hereinafter:

$$\tilde{n}(f_x, f_y, f_z) = \int\int\int_{-\infty}^{\infty} n(x, y, z)\exp\{-i2\pi(f_x x + f_y y + f_z z)\}dxdydz.$$

It has been found that undesired scattering properties can occur if the absolute value of the three-dimensional Fourier transform $\tilde{n}$ has a significant amplitude in the case of modulation vectors f for which at least one of the following two conditions is met:

$$\left|\frac{2}{\lambda}\frac{f_z}{|f|^2} - 1\right| \leq \frac{\Delta\lambda}{\lambda} = u_{max}, \text{ and}$$

$$\left|\frac{2}{\lambda}\frac{f_z\cos\vartheta_{max} + \sqrt{f_x^2 + f_y^2}\sin\vartheta_{max}}{|f|^2} - 1\right| \leq \frac{\Delta\lambda}{\lambda} = u_{max}.$$

In this case, $\lambda$ denotes the wavelength of the illumination radiation for which the optical element is designed, for example $\lambda=500$ nm, and $\Delta\lambda$ denotes the bandwidth of the illumination radiation. $\Delta\lambda$: $\lambda$ can be combined to form the dimensionless parameter $u_{max}$, which can characterize the conditions under which scattered light, in particular scattered light relevant to a user, is generated in the main body.

In this case, x, y and z denote the directions of a Cartesian coordinate system. The z-direction denotes in particular a principal direction of the optical component.

$\vartheta_{max}$ indicates the maximum angle of incidence for which the optical component is intended to be optimized in respect of scattering. $\vartheta_{max}$ indicates in particular the maximum angle of incidence for which the optical component is substantially free of scattering within a predefined scope. $\vartheta_{max}$ is measured relative to the principal axis.

$\vartheta_{max}$ is at most 90°, in particular at most 60°, more particularly at most 45°, even more particularly at most 30°, with particularity at most 20°, with more particularity at most 15° and with even more particularity at most 10°.

A refractive optical component is an optical component which can lead to a change in the direction of propagation of a light beam incident on the component. It can lead in particular to the focusing or divergence of a parallel incident beam.

Generally, the conditions $$\left| \frac{2}{\lambda} \frac{f_z}{|f|^2} - 1 \right| \leq \frac{\Delta\lambda}{\lambda} = u_{max} \text{ and}$$

$$\left| \frac{2}{\lambda} \frac{f_z \cos\vartheta_{max} + \sqrt{f_x^2 + f_y^2} \sin\vartheta_{max}}{|f|^2} - 1 \right| \leq \frac{\Delta\lambda}{\lambda} = u_{max}$$

form exclusion conditions. They define "forbidden regions" for the modulation vector of the Fourier transform of the refractive index profile and thus for the refractive index profile, i.e., the refractive index profile should be determined such that neither of the two inequalities is satisfied for a predefined value of $\vartheta_{max}$.

In this case, $\lambda$ indicates a wavelength for which the optical component is intended to be used.

Refractive index difference should be understood to mean the difference between the maximum refractive index and the minimum refractive index in the main body, in particular in a specific region thereof, more particularly upon passage through the main body.

The refractive optical component is provided in particular for use in the visible range, more particularly in the range of a wavelength $\lambda$ of 400 nm to 800 nm. However, this should not be understood to be restrictive. Refractive optical components for use in the infrared range or for use in the UV range can also be involved. In the case of an envisaged use of the refractive optical component in the non-visible wavelength range, the boundary conditions for the modulation vector f can be adapted to the desired wavelength on the basis of the general formulae.

It has been recognized that a main body having a refractive index profile modulated in such a way that the above-mentioned exclusion conditions (forbidden regions) are complied with results in particularly low scattering losses. With a refractive index profile modulated in this way, scattering losses can be reduced by more than 50%, in particular more than 60% and more particularly more than 70%. In other words, it has particularly advantageous optical properties.

The Fourier transform can be in particular a normalization-free Fourier transform. For practical determination of the Fourier transform, it is possible to use in particular a discrete Fourier transform (DFT) or a fast Fourier transform (FFT).

The Fourier transform is in particular a windowed Fourier transform. The length of the window is in particular at most 10 mm, more particularly at most 5 mm, even more particularly at most 3 mm, with particularity at most 2 mm. It is in particular at least 1 mm. The shorter the length of the window, the greater the flexibility for producing the refractive optical component with regions having different optical properties.

The minimum length of the window is in particular equal to the minimum expected diameter of the pupil of a wearer of spectacles.

The maximum mean distance between adjacent maxima and/or between adjacent minima of the refractive index profile is in particular at most 100 μm, more particularly at most 10 μm. It can in particular be influenced, more particularly determined, by the method for producing the refractive optical component.

When determining the extrema in the refractive index profile, the fluctuations thereof, which can never be completely prevented, shall be disregarded. In particular extrema lying within a range of ±three standard deviations from the mean value of the refractive index profile can be disregarded. It is also possible to disregard extrema that deviate from the mean value of the refractive index by less than $\frac{1}{10}$ of the maximum refractive index difference. It is possible, in particular, up to a maximum refractive index difference of $10^{-6}$, more particularly $2 \cdot 10^{-6}$, even more particularly $4 \cdot 10^{-6}$, with particularity $10^{-5}$, with more particularity $4 \cdot 10^{-5}$, to refer to a homogeneous refractive index profile, that is to say a refractive index profile without extrema. The terms maximum and respectively minimum in the refractive index profile can denote in particular exclusively such extrema which have a refractive index difference in terms of absolute value of at least $10^{-4}$ with respect to the closest adjacent extremum.

The optical component is in particular a lens, more particularly for the production of a spectacle lens. It can also be a spectacle lens produced from such a lens.

In accordance with a further aspect of the disclosure, the main body is manufactured by means of an additive method. The main body is manufactured in particular by means of a three-dimensional printing method. The main body can be manufactured in particular by means of a so-called multi jet modeling (MJM) method. It can also be manufactured by means of a volumetric additive method.

In an additive method, in contrast to a material-removing method, material is added progressively, in particular is applied on a carrier or an already manufactured part of the main body.

The main body can in particular be manufactured from, more particularly consist of, one or more plastics, mineral glasses or quartzes. The main body is manufactured in particular from one or more thermoplastics. The main body can be manufactured in particular from one or more polymers, more particularly photopolymers. In this case, in particular photoactivatable monomers can be applied and cured. Irradiation with UV light, for example, can be provided for curing.

A 3D printing method enables the main body to be manufactured particularly flexibly and cost-effectively.

In accordance with one variant, the refractive index profile in the main body can be modulated in all three spatial directions. The refractive index profile in the main body can have a refractive index difference of at least $10^{-4}$, in particular at least 0.001, more particularly in all three spatial directions.

This enables a particularly flexible design of the optical properties, in particular of the imaging properties, more particularly of the refractive power and/or of the correction of imaging aberrations, of the main body.

The refractive index difference Δn in a direction parallel to the principal direction is in particular at most 0.2, more particularly at most 0.1, even more particularly at most 0.05, with particularity at most 0.03. It can be greater than $10^{-5}$, in particular greater than $10^{-4}$.

The refractive index profile n has in particular a gradient of at most 10/m, more particularly at most 5/m, even more particularly at most 3/m, with particularity at most 2/m, with more particularity at most 1/m, with even more particularity at most 0.5/m, typically at most 0.3/m, more typically at most 0.2/m, even more typically at most 0.1/m, within a layer in a direction transversely to the principal direction. The main body can have a substantially homogeneous refractive index in particular within a layer in a direction transversely to the principal direction.

The refractive index profile in a direction parallel to the principal direction can likewise have a corresponding maximum gradient, apart from the interfaces between two layers adjoining one another. At the interfaces between two layers, however, the gradient of the refractive index profile can be more than 10/m, in particular more than 20/m, more particularly more than 30/m, even more particularly more than 50/m, with particularity more than 100/m. This information relates in particular to ascertaining the gradient of the refractive index profile on a length scale of 1 μm.

In accordance with a further aspect of the disclosure, the refractive index profile has exclusively a modulation in one spatial direction, in particular parallel to a principal direction of the refractive optical component. This can be attributable to a layer-by-layer construction, in particular layer-by-layer manufacturing, of the main body. The layers can be formed in curved fashion in this case. In the case where the layers are formed in curved fashion, the refractive index profile has in particular exclusively a modulation in a direction parallel to a normal to the front side and/or back side of the layers. The refractive index profile has inhomogeneities beyond the normal, statistical fluctuations in the refractive index profile in particular exclusively at the interfaces between two adjacent layers. Within a layer, the refractive index profile has in particular at most 10, more particularly at most 5, even more particularly at most 3, with particularity at most 2 maxima.

In accordance with a further aspect of the disclosure, the main body has in a direction perpendicular to a principal direction an extent at least five times the magnitude, in particular at least ten times the magnitude, of the extent in the principal direction.

The main body can be in particular a planar component. This is advantageous in particular when the main body is used for producing a spectacle lens. In this case, a planar component should be understood to mean in particular a component which has significantly greater extents in two spatial directions compared with the extent in a third spatial direction perpendicular thereto. A planar component has in particular a thickness that is significantly less than the cube route of its volume. The thickness of the main body can be in particular less than one fifth of the cube root of its volume.

This main body is formed in particular in lens-shaped fashion. The front side and the back side of the main body can each be formed as convex, concave or plane. At least one of the two sides can have a curvature. The front side and/or the back side can be formed as spherical, aspherical or as a freeform surface.

The principal direction corresponds in particular to the direction along which the thickness of a lens, more particularly the thickness of the main body, is measured. It is in particular perpendicular to the front side and/or the back side of the optical component, more particularly in a central region thereof. The principal direction can coincide in particular with an optical axis (principal axis) defined by the optical component.

In this case, the term optical axis (principal axis) shall denote in particular the or a straight line along which the refractive power of the optical component is measured. The term thickness of the main body can denote the extent thereof in the direction of the optical axis. The maximum extent of the main body in a direction parallel to the optical axis or a mean value can also serve as the thickness of the main body.

The principal axis is in particular perpendicular to the front side and/or back side of the main body, more particularly in a central region thereof. The principal axis is in particular perpendicular to the front side and/or back side of the main body in the region of the smallest thickness thereof or in the region of the maximum thickness thereof. In the present case, the direction of the principal axis is also referred to as the z-direction.

In accordance with a further aspect of the disclosure, the first direction along which the refractive index profile is modulated coincides with the principal direction.

In accordance with a further aspect of the disclosure, the refractive index profile is quasi-periodic or periodic along the first direction, in particular along the principal direction. This facilitates the manufacturing of the main body. This allows in particular different layers of the main body to be manufactured with substantially identical, more particularly identical, method parameters.

Quasi-periodic should be understood here to mean that the period is permitted to fluctuate around a mean value by up to 10%, in particular up to 30%, more particularly up to 50%. In the case of a periodic profile, the period, in particular the distance between two extrema of the same type, more particularly between two maxima, is constant.

In accordance with a further aspect of the disclosure, the main body is composed of one or more materials having a stress-optical coefficient not equal to zero. It is manufactured in particular from one or more materials which undergo a change in volume, more particularly volume shrinkage, during curing from a liquid state.

The stress-optical coefficient is a parameter used to describe the dependence of the refractive index of a material on a mechanical stress field. For determining the stress-optical coefficient, reference should be made to DIN 52314.

In accordance with a further aspect of the disclosure, the main body has an at least regionally homogeneous or constant refractive index in a direction perpendicular to the first direction, in particular in a direction perpendicular to the principal direction. The regions having homogeneous refractive indices can extend over an extent which is at least equal to the thickness, in particular the average thickness or the maximum thickness, of the main body in a direction transversely to the principal direction. They can extend in particular from one edge of the main body to an opposite, more particularly diametrically opposite, edge of the main body. They can extend transversely to the principal direction, in particular perpendicular to the principal direction, more particularly over the entire extent of the main body. In this case, however, they can have curved interfaces. In particular regions having a homogeneous refractive index which extend transversely to the principal direction over the entire extent of the main body are also referred to hereinafter as layers or optical layers.

In accordance with a further aspect of the disclosure, the main body has a plurality of optical layers. This enables particularly flexible manufacturing.

The optical layers can be defined in particular by their manufacturing process. In this case, an optical layer is understood to mean a volume region of the main body which is applied in a single, in particular temporally contiguous, application step and/or is cured in a single curing step. Successive layers are in particular progressively applied one on top of another and cured. The optical layers can be formed as topologically path-connected, in particular simply connected. They can also be formed as path-connected, but not simply connected.

They can also have a plurality of disjoint, topologically unconnected volume regions. Combinations of unconnected and/or path-connected and/or simply connected layers are likewise possible. An optical layer should be understood to mean a region extending in a direction transversely, in particular perpendicular, to the principal direction, more particularly a path-connected region, even more particularly a simply connected region, of the main body having a homogeneous or constant refractive index. An interface is in each case formed between two layers adjoining one another, the refractive index profile having an inhomogeneity at the interface. Inhomogeneity in the refractive index profile should be understood to mean that the refractive index at this point has a value which deviates from the refractive index in at least one adjoining region, in particular by a refractive index difference of at least $10^4$, more particularly at least 0.001. The refractive index can have an extremum, in particular a maximum or a minimum, in the region of the interface between two layers adjoining one another. The interface itself can constitute an isosurface of the refractive index. However, refractive index fluctuations can also occur within the interface itself.

The optical layers extend in each case transversely, in particular perpendicular, to the principal direction.

The layers are oriented in particular in such a way that the interfaces are adapted to the shape of the front side and/or back side of the main body. The interfaces are aligned in particular in such a way that they end neither on the front side nor on the back side of the main body. The layers are terminated in particular neither by the front side nor by the back side of the main body. Such an alignment of the interfaces results in particularly advantageous scattering properties. In particular a coupling to the incident wave, more particularly a scattering in the forward direction, can be reduced, even particularly avoided, by means of such an alignment of the interfaces.

In accordance with a further aspect of the disclosure, the optical layers have a thickness that varies in a direction perpendicular to the principal direction. The optical layers have in particular a thickness measured parallel to the principal direction which varies in a direction perpendicular to the principal direction.

It has been recognized according to the disclosure that undesired scattering losses can thereby be reduced.

In accordance with one aspect of the disclosure, it is possible to describe the thickness of the optical layers, depending on the position perpendicular to the principal direction, by a two-dimensional, continuous, in particular continuously differentiable, function.

The optical layers can be formed in curved fashion. They can also have at least one interface formed in plane fashion. They can generally have an arbitrary selection from convex, concave and plane interfaces.

In accordance with a further aspect of the disclosure, the main body has a plurality of layers which form a weakly harmonic or anharmonic layer grating. In this case, a layer grating should be understood to mean a one-dimensional refractive index grating. The layer grating has in particular a harmonic, weakly harmonic or anharmonic modulation in the z-direction. A harmonic modulation can be described by a harmonic function (sine or cosine) with a single frequency.

Up to ten frequencies are necessary for the description of a weakly harmonic modulation. More than ten frequencies are necessary for the description of an anharmonic modulation.

It has been recognized according to the disclosure that the optical layers can typically be formed in such a way that they constitute, in particular at least approximately, a Bragg grating. They can constitute in particular a Bragg grating that has only a very small, more particularly no, scattering effect in the forward direction. The scattering effect in the forward direction is at most 3%, in particular at most 2%, more particularly at most 1%. The scattering effect in the forward direction comprises on the one hand the so-called small-angle scattering of up to 0.5° around the direction of an incident beam, but on the other hand also the so-called haze, which deviates by up to 20° from the direction of the incident beam.

Scattering in the forward direction means that part of the incident beam is deflected by more than 0°, but less than 90°.

In this case, haze can be understood to mean the quantity of light in percent which deviates on average by more than 2.5° from the direction of the incident light beam.

In accordance with a further aspect of the disclosure, at least two, in particular all, of the optical layers are composed of the same material. However, the optical component can additionally comprise further layers or plies. Such layers or plies can have in particular non-optical functions. They can be used to protect the optical component, for example.

In accordance with one alternative, the optical component has two, three or more optical layers composed of different materials.

In accordance with a further aspect of the disclosure, the number of optical layers is at least two, in particular at least three, more particularly at least five, even more particularly at least ten, with particularity at least twenty, with more particularity at least thirty, with even more particularity at least fifty, typically at least one hundred, more typically at least two hundred, even more typically at least three hundred. The number of optical layers is usually less than 100,000, in particular less than 10,000. This is not a mandatory boundary condition.

The number of optical layers is constant in particular over the extent of the optical component transversely to the principal axis. The number of optical layers is constant in particular within an optically used region of the optical component. The optical layers in particular do not end on the front side or the back side of the main body of the optical component. They extend in particular between the front side and the back side of the main body and are thus at a distance from these sides, apart from the two outermost layers.

A larger number of optical layers enables more flexible production of the optical component. They make it possible in particular to predefine the thickness profile and thus the refractive power of the optical component substantially freely.

In accordance with a further aspect of the disclosure, the optical layers each have a maximum thickness climax of at most 1 mm, in particular at most 500 µm, more particularly at most 300 µm, even more particularly at most 200 µm, with particularity at most 100 µm, with more particularity at most 50 µm, with even more particularity at most 30 µm, typically at most 20 µm, more typically at most 10 µm.

The maximum thickness can be measured here in each case in a direction parallel to the principal direction.

In accordance with a further aspect of the disclosure, the optical layers each have a minimum thickness $di_{min}$ of at least 1 µm, in particular at least 2 µm, more particularly at least 3 µm, even more particularly at least 5 µm, with particularity at least 10 µm.

The minimum thickness can be measured here in each case in a direction parallel to the principal direction.

It has been recognized that a small thickness of the optical layers results in particularly advantageous optical properties of the optical component. In particular, the angle-of-incidence range free of scattered light can be increased by reducing the thickness of the optical layers. The angle-of-incidence range free of scattered light can be in particular at least 10°, more particularly at least 15°.

In accordance with a further aspect of the disclosure, the ratio of the maximum thickness $di_{max}$ to the minimum thickness $di_{min}$ of a layer, in particular of all layers, can be in each case at least 1.05, in particular at least 1.1, more particularly at least 1.2, even more particularly at least 1.3, with particularity at least 1.5.

In accordance with a further aspect of the disclosure, at least two of the optical layers have different maximum thicknesses $d1_{max}$, $d2_{max}$. The relative thickness in distances can be up to 10%, in particular up to 20%, more particularly up to 30%, even more particularly up to 50%, with particularity up to 100%. This information should not be understood to be restrictive. As an alternative thereto, it is possible to form all the optical layers with the same maximum thickness $di_{max}$.

If layers having different thicknesses are permitted, this opens up an additional degree of freedom for the production of the optical component. The boundary condition according to which all the optical layers have the same maximum thickness $di_{max}$ can result in a simplification of the method control of the production process.

In accordance with a further aspect of the disclosure, at least one of the interfaces between two optical layers adjoining one another is at a distance $d_V$ from the front side and a distance $d_R$ from the back side of the optical component, in particular the main body thereof, wherein a ratio of the distances $d_V$:$d_R$ varies in a direction perpendicular to the principal direction by a maximum of 30%, in particular a maximum of 20%, more particularly a maximum of 10%, even more particularly a maximum of 5%, with particularity a maximum of 3%, with more particularity a maximum of 2%, with even more particularity a maximum of 1%. The ratio is typically constant.

In this case, front side and back side of the main body are the simply connected, in particular continuously differentiable, surfaces of the main body with an extent transversely to the principal direction.

Typically, all of the interfaces are aligned correspondingly.

In this case, the distance between the interfaces and the front side and the back side of the optical component is measured in particular in a direction parallel to the principal direction.

It has been found that such a formation of the optical layers results in particularly advantageous optical properties. It is thereby possible in particular to prevent refractive index inhomogeneities from occurring in the region of the front side and/or the back side of the optical component. In particular the generation of scattered light can be reduced, more particularly avoided, by this means.

In accordance with a further aspect of the disclosure, the optical layers each have a constant refractive index in their interior. They have in particular homogeneous, i.e., constant, optical properties in their interior. Inhomogeneities, i.e., variations, arise in particular exclusively in the region of the interfaces between two layers adjoining one another.

In accordance with a further aspect of the disclosure, adjacent interfaces between layers adjoining one another are at distances which vary in the principal direction by a maximum of 30%, in particular a maximum of 20%, more particularly a maximum of 10%, even more particularly a maximum of 5%, with particularity a maximum of 3%, with more particularity a maximum of 2%, with even more particularity a maximum of 1%. The distances between layers adjoining one another are typically constant. They form in particular a quasi-periodic sequence, or a periodic sequence.

The generation of scattered light is reduced, in particular avoided, by this means.

In this case, the distances, in particular proceeding from a starting point on the front or back side of the optical component, are measured in a direction parallel to the principal direction.

The periodicity of the layers runs in particular parallel to the principal direction.

In accordance with a further aspect of the disclosure, the optical component has at least one additional layer composed of a different material than the optical layers. The additional layer extends in a direction perpendicular to the principal direction in particular over the entire extent of the optical component. The additional layer can be in particular a carrier. In particular a hard layer, more particularly a transparent hard layer, can serve as additional layer. In this case, a transparent hard layer comprises a thin layer of lacquer that is in turn applied to a carrier, e.g., a lens composed of plastic, and thus makes precisely the lens less sensitive to external influences such as e.g., scratching. A coating, for example an antireflection coating, can also serve as additional layer. Furthermore, a layer that improves the cleanability of the lenses, e.g., composed of a hydrophobic material, can serve as additional layer.

A further object of the disclosure is to improve a spectacle lens. This object is achieved by means of a spectacle lens comprising an optical component in accordance with the preceding description. The advantages are evident from those of the optical component.

The spectacle lens has particularly advantageous scattering properties, in particular. Up to the maximum angle of incidence $\vartheta_{max}$, it is in particular free of regions generating scattered light.

A corresponding spectacle lens is able to be manufactured very flexibly, in particular. The optical design of the spectacle lens is predefinable very freely, in particular. Typically, the refractive power/or correction powers of the spectacle lens, for example for correcting astigmatism, can be predefined substantially freely. It is also possible, in particular, to form the spectacle lens as a multifocal lens, more particularly as a bifocal lens, a trifocal lens, in particular as a progressive lens. The spectacle lens can be formed in particular as a freeform lens. It can be individually adapted to a user's eye. The optical design can be calculated with the aid of a computer-aided method.

In accordance with one aspect of the disclosure, a progressive lens is involved.

In accordance with a further aspect of the disclosure, the spectacle lens has an additional coating. The coating can be in particular a functional coating, for example an antireflection coating and/or a tinting and/or a coating for filtering out a specific wavelength range.

A further object of the disclosure is to improve a method for producing an optical component.

This object is achieved by means of a method in which construction data of the main body to be manufactured are provided and the main body is manufactured by progressively applying material to a carrier in accordance with the construction data provided.

The construction data of the main body to be manufactured can be ascertained in particular individually, more particularly by measuring the eyes of a user. In particular, a computer-aided method, more particularly so-called lens design software (LDS), can be used to ascertain the construction data of the main body.

In this case, the refractive index profile in the main body, in particular the three-dimensional Fourier transform thereof, has precisely the properties described above. In particular, the exclusion conditions are complied with.

The advantages are evident from what has already been described.

The method comprises in particular an additive manufacturing method, more particularly a 3D printing method.

In accordance with one aspect of the disclosure, the material is applied droplet by droplet. In this case, in particular the size, that is to say the volume, of the individual droplets and/or the application density and/or the material thereof can be varied depending on the construction data. The parameters mentioned, in particular the droplet size and/or the application density thereof, can be varied in particular within a single layer.

This enables a particularly flexible, targeted formation of the main body, in particular of the optical layers, more particularly of the thickness profile thereof.

In accordance with a further aspect of the disclosure, an optical component, in particular a transparent component, serves as carrier.

In particular, a hard layer or an antireflection layer or a hydrophobic layer or a lens can also serve as carrier.

In particular, a lens selected from a set of standard lenses having a specific refractive index can serve as carrier. The carrier can be selected in particular from a set of standard lenses having a refractive power in the range of −10 diopters to 10 diopters graduated in steps of 0.5 diopter. In this case, the standard set comprises 41 different carriers. A smaller number is possible. The material applied to the carrier can then serve for the fine tuning of the optical properties, in particular for compensating for higher-order optical aberrations of the eye lens.

In accordance with a further aspect of the disclosure, the material is applied to the carrier layer by layer. The material is applied to the carrier in particular in path-connected, but not simply connected or in simply connected volume regions. It can also be applied to the carrier simultaneously in a plurality of unconnected volume regions.

Firstly, this enables the material to be applied particularly simply. Secondly, this enables the optical properties of the main body to be controlled particularly well.

In accordance with one aspect of the disclosure, the layers are at least partly, in particular fully, cured in each case before the next layer is applied. It can be cured in particular by means of electromagnetic radiation, more particularly by means of UV light. They can also be cured by heating. This enables particularly uniform, homogeneous curing of the layers.

In accordance with a further aspect of the disclosure, the size of the droplets and/or the density thereof are/is varied within an optical layer. The change in the droplet size typically follows from the desired change in layer thickness. A change in the layer thickness by 1% can be achieved for example by means of a change in the droplet volume by $1.01^3=1.03030$, that is to say a change in the droplet volume by approximately 3%.

This enables the thickness profile of the layers to be influenced in a simple manner.

The material for manufacturing the optical layers, in the course of the latter being applied, has in particular a viscosity of less than 10 mPas, more particularly less than 5 mPas, even more particularly less than 3 mPas, with particularity less than 2 mPas, with more particularity less than 1 mPas. This information relates to room temperature, in particular 20° C.

By means of the method described, a spectacle lens of high optical quality can be manufactured very flexibly in a particularly simple manner.

A further aspect of the disclosure relates to a correspondingly manufactured spectacle lens.

A further aspect of the disclosure relates to a computer program product for carrying out the method described above. The computer program product makes it possible, by means of provided construction data of a main body, to control a device for additive manufacturing of the main body in such a way that the main body has a predefined refractive index profile with a predefined Fourier transform and in particular layers with a predefined thickness variation.

By means of the computer program product, a device for additive manufacturing of the main body can be controlled in particular in such a way that the main body has precisely the properties described above.

By means of the computer program product, it is possible to control in particular the number and/or size and/or application density and/or the temporal profile of the application and/or the curing of the volume regions to be applied, in particular the material droplets to be applied.

A further aspect of the disclosure relates to a data medium with construction data of a spectacle lens in accordance with the preceding description.

In particular, a device and/or a method for manufacturing a corresponding spectacle lens can be controlled with the aid of the construction data stored on the data medium.

The construction data can be stored in particular on a CD-ROM or a USB storage device.

A further aspect of the disclosure relates to a device for additive manufacturing of a main body.

The device is controllable in such a way that, by means of provided construction data of the main body, the device can manufacture a main body having a predefined refractive index profile and a Fourier transform thereof with the properties described above.

The device comprises a 3D printer, in particular. It has in particular a controllable applying device, by means of which the size and/or application density and/or temporal parameters of the application of material for manufacturing the main body are/is controllable.

A further object of the disclosure is to improve a spectacle lens.

In order to achieve this object, a spectacle lens comprises a main body manufactured layer by layer, e.g., by means of a 3D printing method, and having a front side and a back side and a principal axis perpendicular to the front side and/or back side, and wherein the main body has a plurality m of optical layers extending between the front side and the back side and each having a thickness in a direction parallel to the principal axis, wherein each of the layers extends over a region common to all the layers in directions perpendicular to the principal axis, the common region being greater than the maximum thickness of the respective layer at least by a factor of 10, wherein the thickness of the layers varies over the extent thereof transversely to the principal axis, and wherein the thickness of the layers is in the range of 1 μm to 100 μm.

Further details of the spectacle lens and advantages thereof are evident from the preceding description.

A further object of the disclosure is to provide a corresponding method for manufacturing a spectacle lens.

The method according to the disclosure for manufacturing a spectacle lens comprises producing a main body layer by layer, e.g., with the aid of a 3D printing process, wherein the layers of the main body are arranged in a first direction in such a way that the main body has a front side and a back side and a principal axis perpendicular to the front side and/or back side, wherein the main body has a plurality m of optical layers extending between the front side and the back side and each having a thickness in a direction parallel to the principal axis, wherein each of the layers extends over a region common to all the layers in directions perpendicular to the principal axis, the common region being greater than the maximum thickness of the respective layer at least by a factor of 10, wherein the thickness of the layers varies over the extent thereof transversely to the principal axis, and wherein the thickness of the layers is in the range of 1 μm to 100 μm.

For the technical implementation with the aid of a 3D printing process, e.g., the size of the liquid plastic droplets in the layer-by-layer printing process can be suitably varied individually in a lateral direction. As a result, the thickness of an individual layer can be altered in any desired way during application. Alternatively, the writing density or the relative position of the droplets with respect to one another can be suitably altered.

These alternatives are only examples. Other technical implementations are also possible, the common property of which consists in adapting the writing process during application of an individual layer such that a layer having a variable thickness in the spatial directions arises.

Another object of the disclosure is to provide a corresponding apparatus for manufacturing a spectacle lens.

The apparatus according to the disclosure for manufacturing a spectacle lens comprises a device for producing a main body layer by layer and a computer configured to control the device on the basis of fabrication data stored in the computer for producing the main body layer by layer in such a way that the layers of the main body are arranged in a first direction in such a way that the main body has a front side and a back side and a principal axis perpendicular to the front side and/or back side, wherein the main body has a plurality m of optical layers extending between the front side and the back side and each having a thickness in a direction parallel to the principal axis, wherein each of the layers extends over a region common to all the layers in directions perpendicular to the principal axis, the common region being greater than the maximum thickness of the respective layer at least by a factor of 10, wherein the thickness of the layers varies over the extent thereof transversely to the principal axis, and wherein the thickness of the layers is in the range of 1 μm to 100 μm.

A corresponding computer-readable data medium comprises fabrication data on the basis of which a spectacle lens of the type described above is able to be manufactured by a method described above when the fabrication data are read out by the computer of the apparatus mentioned above.

BRIEF DESCRIPTION OF THE DRAWINGS

The disclosure will now be described with reference to the drawings wherein.

DESCRIPTION OF EXEMPLARY EMBODIMENTS

Various variants of an optical component 1 are described below with reference to FIGS. 1 to 3.

The optical component 1 is typically a lens, in particular for manufacturing a spectacle lens. With particularity, the optical component 1 is a transparent optical component.

Figure 1:
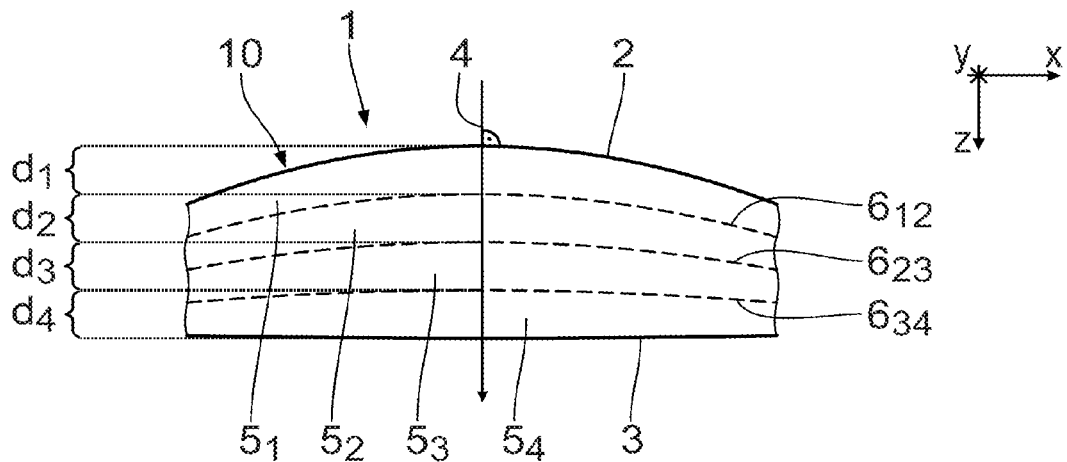
FIG. 1 schematically shows a cross section through an optical component with a plurality of layers.
Figure 2:
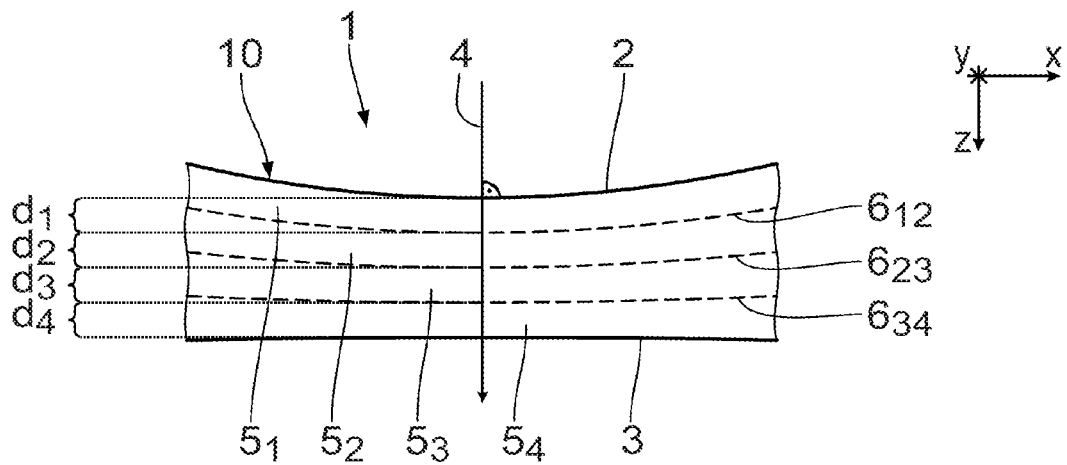
FIG. 2 shows an illustration in accordance with FIG. 1 of an optical component with a different geometric formation.
Figure 3:
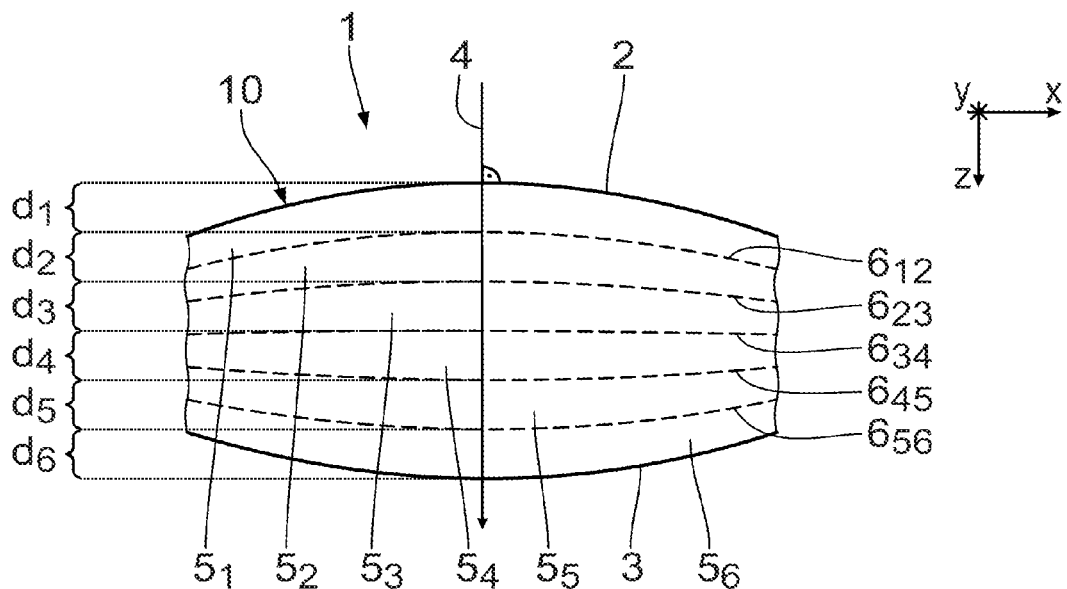
FIG. 3 shows an illustration in accordance with FIG. 1 of an optical component with a different geometric formation, and FIG. 4 schematically shows a sequence of an iterative method for producing an optical component by means of a 3D printing method.

A planoconvex lens is illustrated by way of example and schematically in FIG. 1, a planoconcave lens in FIG. 2 and a biconvex lens in FIG. 3. The disclosure is not restricted to the forms illustrated in the drawings. Other forms are likewise possible. The lens can be a spherical lens, an aspherical lens, or a freeform lens.

Generally, the optical component 1 comprises a main body 10 having a front side 2 and a back side 3. The front side 2 and the back side 3 extend transversely to a principal direction 4. The principal direction 4 corresponds in particular to the beam direction of light incident on the optical component 1 with perpendicular incidence. It corresponds in particular to the optical axis of the optical component 1.

The optical component 1 comprises a plurality of optical layers $5_i$. The number m of optical layers $5_i$ illustrated in the drawings should be understood to be by way of example. The number m of optical layers $5_i$ is at least two. It can also be significantly greater. It can be in particular more than 100. By way of example, a 2 mm thick spectacle lens can have approximately 200 optical layers.

The number m of optical layers $5_i$ is in particular constant in an optically used region. This is attributable to the fact that no layer ends on the front side 2 or the back side 3 of the main body 10, that is to say it is intersected by these sides. In other words, the layers $5_i$ run between the front side 2 and the back side 3.

The optically used region has in particular an area of at least 1 $cm^2$, more particularly at least 2 $cm^2$, even more particularly at least 3 $cm^2$, with particularity at least 5 $cm^2$, with more particularity at least 10 $cm^2$. This information should not be understood to be restrictive. Larger or smaller optical components are likewise possible, in principle.

The optical layers $5_i$ extend in each case transversely to the principal direction 4. They can be formed in curved fashion.

They have in particular a thickness di that varies in a direction perpendicular to the principal direction 4. By way of example, the thickness di of the optical layers $5_i$ in the case of the optical component 1 in accordance with FIG. 1 is larger in the central region than in the edge region. In the case of the optical component 1 in accordance with FIG. 2, the thickness di of the optical layers $5_i$ is smaller in the central region than in the edge region. The ratio of the largest thickness $di_{max}$ of an optical layer $5_i$ to the smallest thickness $di_{min}$ thereof can be in particular at least 1.05, more particularly at least 1.1, even more particularly at least 1.2, with particularity at least 1.3, with more particularity at least 1.5.

The profile of the optical layers that is to say the profile of the layer structure of the optical component 1, is formed in a manner adapted in particular to the shape of the front side 2 and/or of the back side 3.

An interface $6_{ij}$ is in each case formed between in each case two layers $5_i$, $5_j$ adjoining one another. The interfaces $6_j$ are represented by dashed lines in the drawings.

At the interfaces $6_{ij}$, a refractive index profile has in each case an inhomogeneity, in particular in the form of a maximum or a minimum.

For the rest, the optical layers $5_i$ are typically formed in homogeneous fashion. They have homogeneous optical properties in particular in their interior. They have a uniform, that is to say a homogeneous or constant, refractive index in particular transversely to the principal direction 4.

The interfaces $6_{ij}$ are formed in particular in such a way that they constitute as uniform a transition as possible from the shape of the front side 2 to the shape of the back side 3.

The optical layers $5_i$ are formed in particular in such a way that, along a straight line running parallel to the principal direction 4, they divide the distance between the front side 2 and the back side 3 of the optical component 1 equidistantly. This typically applies to any arbitrary straight line running through the optical component 1 parallel to the principal direction 4.

The profile of the interfaces $6_{ij}$ is adapted in particular to the profile of the front side 2 and/or of the back side 3. It is adapted in particular progressively to the geometry of the front side 2 and the geometry of the back side 3.

Upon passing through the optical component 1 in a direction parallel to the principal direction 4, an at least approximately periodic sequence, in particular a periodic sequence, of the refractive index inhomogeneity is thus ascertainable. The maximum period of this sequence is typically less than 1 mm, in particular less than 500 μm, more particularly less than 300 μm, even more particularly less than 200 μm, with particularity less than 100 μm, with more particularity less than 50 μm, with even more particularity less than 30 μm, typically less than 20 μm, more typically less than 10 μm.

These values are correspondingly applicable to a maximum thickness $di_{max}$ of the optical layers $5_i$.

Details of the method for producing the optical component 1 are described below.

The optical component 1 is produced in an additive manufacturing method, in particular in a 3D printing method. In this case, material is applied to a carrier, in particular. The material is applied progressively in accordance with provided construction data of the main body.

The material is applied layer by layer, in particular. The optical layers $5_i$ are applied progressively, in particular, that is to say that an optical layer $5_j$ where j>i is applied only after the optical layer $5_i$ has been applied.

It is also possible to start applying a layer $5_{i+1}$ before the preceding layer $5_i$ has been completely applied.

The optical layers $5_i$ are applied in a liquid state, in particular.

Provision is made for applying the optical layers $5_i$ droplet by droplet.

After the optical layers $5_i$ have been applied, the optical layers $5_i$ are partly or completely cured.

Irradiation by means of UV light and/or a thermal treatment can be provided for curing the optical layers $5_i$.

Lateral material inhomogeneities within one and the same optical layer $5_i$ can be minimized for example by mixing the liquid droplets after application, but before the curing thereof.

In particular, a plastic or a mineral glass having a stress-optical coefficient≠0 serves as material for the optical layers $5_i$. Since a change in volume, in particular isotropic shrinkage of the material, can occur during the curing of the optical layers $5_i$, this results in mechanical stresses in the region of the interfaces $6_{ij}$, the mechanical stresses resulting in the refractive index inhomogeneities already mentioned.

As already mentioned, provision is made for the thickness di of the optical layers $5_i$ to vary over the extent thereof transversely to the principal direction 4. For this purpose, the size, in particular the volume, of the applied droplets can be varied in a lateral direction during application. It is also possible to vary the density of the applied droplets, in particular their relative position with respect to one another, over the extent of the optical component 1 in a transverse direction. It is thereby possible to produce the optical layers $5_i$ with a variable thickness di in a very flexible manner.

The variation of the droplet size and/or the density of the applied droplets can be controlled precisely in a simple manner by control of the print head.

The diameter of the droplets during application is in particular at most equal to the maximum thickness climax of the layer $5_i$ to be manufactured in each case.

The diameter and/or the application density of the droplets can vary within a single layer.

The optical component 1 produced in accordance with the method is, in particular, an optical component for manufacturing a spectacle lens, more particularly a progressive lens.

The optical component can be subjected to further processing steps. It is also possible to manufacture the spectacle lens directly with the aid of the method described above.

In addition, a coating can be applied to the optical component 1. The spectacle lens can have in particular an additional, functional coating, more particularly an antireflection coating.

In particular, a device for additive manufacturing of the main body 10 is provided for manufacturing the main body 10. The device is in particular a 3D printer, more particularly a 3D printer according to the multi jet modeling principle or the fused deposition modeling (FDM) principle. It can also be a 3D printer for a volumetric manufacturing method. With such a printer, it is possible to manufacture the main body 10 substantially in layerless fashion, that is to say without interfaces between individual layers.

The device is controllable by means of provided construction data of the main body 10. It is controllable in particular in such a way that the main body has a predefined refractive index profile with a predefined Fourier transform.

The device is controllable in particular by means of a computer program product. The computer program product can control the device for additive manufacturing of the main body 10 with the aid of the provided construction data of the main body 10.

The concrete optical and/or geometric data of the main body 10 to be manufactured can serve as construction data.

In particular, a concrete refractive index distribution and the Fourier transform thereof can be predefined as construction data.

Alternatively or additionally, it is also possible to ascertain the construction data from the prescription data for a spectacle lens to be manufactured. This ascertainment can be carried out by the computer program product of the device for additive manufacturing of the main body 10. It can also be carried out by means of a further, separate computer program product, in particular of a CD-ROM or of a DVD with so-called lens design software (LDS). It is possible, in particular, to calculate from the prescription data for a spectacle lens the construction data of the main body 10, more particularly the refractive index profile of the main body 10, and also control parameters for controlling the material application with the aid of the device for additive manufacturing of the main body 10.

It is also possible that for manufacturing the main body 10, in particular the spectacle lens to be manufactured therefrom, measurement data for characterizing a user's defective vision are ascertained and communicated to a separate computing unit. By means of the separate computing unit, from the measured values for characterizing the defective vision, it is possible to ascertain construction data of the main body 10 for compensating for the defective vision. The data can then be made available as a computer program product for controlling a device for additive manufacturing of the main body 10.

By means of the device for additive manufacturing of the main body 10, the main body 10 and the spectacle lens manufactured therefrom are able to be manufactured very flexibly in a particularly simple manner.

Figure 4:
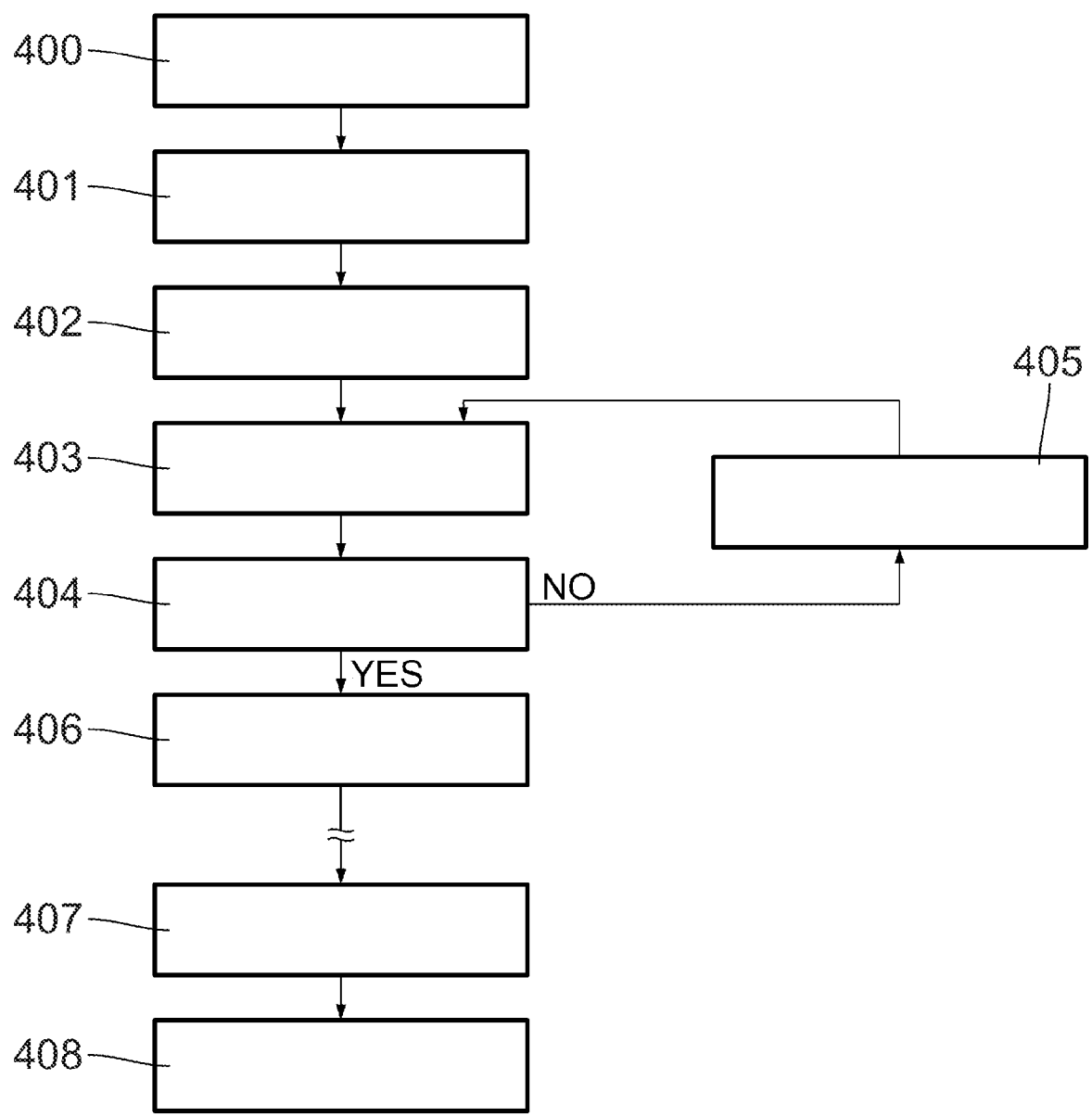

A description is given below, with reference to FIG. 4, of an iterative method as to how a refractive optical component can be produced in a computer-controlled manner by means of an additive manufacturing method.

Input parameters provided in a step 400 for providing input parameters are the desired refractive index of the refractive optical component to be produced, the refractive index of the material from which the optical component is intended to be produced, and also stipulations with regard to the shape or curvature of an interface of the optical component to be produced. The material is typically a monomer that is polymerized after each layer has been applied, the polymer being transparent in the used wavelength range of the optical component. In this case, the refractive index of the material taken into account is the refractive index in the polymerized state. A further input parameter is empirical information about the refractive index inhomogeneity that occurs at the interfaces during polymerization of the material. A further input parameter can typically be a target thickness of the layers to be manufactured. A further input parameter is the predefined maximum angle of incidence $\vartheta_{max}$. A further input parameter is the spectrum of wavelengths in the used range.

In cases where the refractive optical component to be produced is a spectacle lens, in particular a progressive spectacle lens, further input parameters can be provided, for example stipulations about the addition in a near-vision part of the spectacle lens, about the width and course of the so-called intermediate corridor, and user-specific stipulations such as the spectacle lens forward inclination and/or corneal vertex distance after the spectacle lens has been fitted in the spectacle frame.

In a first simulation step 401, on the basis of the input parameters assuming a homogeneous refractive index profile in the optical component to be produced, a first model of the optical component is calculated with regard to its thickness and the shape of the second surface such that it fulfills the further predefined input parameters.

In a second simulation step 402, on the basis of the first model calculated in the first simulation step, a modified second model of the optical component is calculated, which layer by layer comprises a number of layers having a predefined target layer thickness. In this case, taking account of the refractive index inhomogeneities to be expected at the interfaces of the individual layers in the second model, the thickness of the optical element and the shape of the second surface are adapted so that the further predefined input parameters are still fulfilled.

In a third step 403, on the basis of the second model taking account of the refractive index inhomogeneities to be expected at the interfaces of the individual layers and the layer thickness in the second model, the three-dimensional refractive index profile n(x,y,z) and the three-dimensional Fourier transform of the three-dimensional refractive index profile n(x,y,z) are calculated according to the equation $$\tilde{n}(f_x, f_y, f_z) = \int\int\int_{-\infty}^{\infty} n(x, y, z)\exp\{-i2\pi(f_x x + f_y y + f_z z)dxdydz.$$

The discrete Fourier transform (DFT) or a fast Fourier transform (FFT) can be used for calculating the Fourier transform.

A fourth step 404 involves checking whether the modulation vector $$f=(f_x,f_y,f_z)$$

of the three-dimensional Fourier transform of the three-dimensional refractive index profile n(x,y,z) satisfies the boundary conditions in accordance with the preceding description ("forbidden regions," see page 9).

If it is established in the fourth step 404 that at least one of the exclusion conditions is not met, that is to say that one of the two inequalities is satisfied, in a recursion step 405 a further model of the optical component is calculated, which layer by layer consists of a number of layers having changed layer thicknesses. In this case, the layer thicknesses are not just altered uniformly, rather the layer thicknesses are altered in a location-dependent manner, such that the layer thicknesses increase or decrease from the center of the optical component toward the edge region. As in step 402 above, taking account of the refractive index inhomogeneities to be expected at the interfaces of the individual changed layers in the further model, the thickness of the optical component and the shape of the second surface are one again adapted such that the further predefined input parameters are still fulfilled by the further model.

Afterward, the third step 403 and the fourth step 404 are applied again to the further model of the optical component and a check is again made to establish whether the three-dimensional Fourier transform of the three-dimensional refractive index profile n(x,y,z) of the further model complies with the exclusion conditions. If it is established that at least one of the exclusion conditions is still not complied with, the recursion step 405 is performed again. In the process, a check is then furthermore made to establish whether, with regard to the exclusion conditions not being met, in comparison with the result in the preceding recursion step, an improvement has occurred with regard to the non-compliance with the exclusion conditions, that is to say whether the deviations from $u_{max}$ have become larger or smaller. The result of this comparison is then taken into account in the calculation of a new further model in the recursion step 405.

In the manner described above, the recursion steps 403, 404 and 405 are carried out repeatedly, either until it is established in step 404 that the exclusion conditions are both simultaneously complied with, or until it is established in step 404 that the last recursion no longer achieves any further improvement with regard to the exclusion conditions not being met, compared with the preceding recursion. In the latter case, the method is terminated.

If, after a number of recursion loops of the recursion steps 403, 404 and 405 have been executed, it is established that the exclusion conditions are simultaneously complied with, in a step 406 on the basis of the last model of the optical component analyzed in step 404, a control program for a 3D printer 407 is created which controls the 3D printer 407 such that the layer thicknesses and layer thickness profiles to be applied by the 3D printer correspond to the layer thicknesses and layer thickness profiles in the last model of the optical component analyzed in step 404. The control program also effects control of the pump in the print head of the 3D printer or the selection of an activated cannula thickness in the print head of the 3D printer as a function of the respective three-dimensional spatial coordinate, such that the layer thicknesses and layer thickness profiles of the model of the optical component analyzed in the last execution of step 404 are realized.

In a subsequent step, then the control program created in step 406 is sent to the 3D printer 407 and the refractive optical component 408 is printed.

In the method described above, a fixed target layer thickness is predefined in the second simulation step 402. In an alternative embodiment, in the second simulation step 402, on the basis of simulations carried out previously, a second model that already has a layer thickness varying in a location-dependent manner can also already be taken as a basis. The subsequent steps 403 to 406 can then likewise be executed as described above, with the difference that in general a smaller number of recursion loops of steps 403, 404, and 405 is required.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A refractive optical component comprising:
a main body manufactured in a 3D printing method, the main body having a front side, a back side, and a principal axis perpendicular to at least one of the front side or the back side,
wherein the main body has a plurality of optical layers extending between the front side and the back side and each optical layers from the plurality of optical layers having a thickness in a direction parallel to the principal axis in a range of 1 μm to 100 μm,
wherein the optical layers are applied one on top of another,
wherein the number of optical layers is constant over an extent of the refractive optical component transversely to the principal axis,
wherein each of the optical layers extends over a common region being common to all the optical layers in directions perpendicular to the principal axis, the common region being greater than a maximum thickness of the respective layer by at least a factor of 10,
wherein the thicknesses of the optical layers vary over the extent thereof transversely to the principal axis,
wherein the main body has a refractive index profile that is modulated at least in a direction parallel to the principal axis, with:
a plurality of maxima and minima,
a distance between adjacent maxima and minima ranging between 0.5 μm and 100 μm, and
a refractive index difference between adjacent maxima and minima ranging between $10^{-4}$ and 0.3, and
wherein a number of maxima in the refractive index profile within a given optical layer in directions transversely to the principal axis is less than 20.

2. The refractive optical component as claimed in claim 1, wherein the refractive optical component is a spectacle lens.

3. The refractive optical component as claimed in claim 1, wherein the number of optical layers is at least 50.

4. The refractive optical component as claimed in claim 1, wherein the optical layers each have surface normals which are inclined by at most 67° relative to the direction of the principal axis.

5. The refractive optical component as claimed in claim 1, wherein the refractive index profile is homogeneous along the front side.

6. The refractive optical component as claimed in claim 1, wherein the refractive index profile is homogeneous along the front side and the back side.

7. The refractive optical component as claimed in claim 1, wherein interfaces running between two layers adjoining one another are aligned in each case such that the interfaces end neither on the front side nor on the back side of the main body.

8. The refractive optical component as claimed in claim 1, wherein the main body has a maximum thickness of at most 8 mm in the direction parallel to the principal axis and an extent of at least 1 cm in the directions perpendicular to the principal axis.

9. The refractive optical component as claimed in claim 1, wherein the refractive index profile is quasi-periodic along the principal axis.

10. The refractive optical component as claimed in claim 1, wherein the refractive index profile is periodic along the first direction.

11. The refractive optical component as claimed in claim 1, wherein interfaces running transversely between two layers adjoining one another in a principal direction in each case are located at a first distance from the front side and a second distance from the back side of the main body, and wherein a ratio of the first distance to the second distance varies by at most 30% over the extent of the main body in the directions transversely to the principal direction.

12. The refractive optical component as claimed in claim 1, wherein proceeding from an arbitrary point on the front side of the main body adjacent interfaces in a sequence of interfaces in the principal direction are arranged at distances which vary by at most 30%.

13. A spectacle lens manufactured from a refractive optical component as claimed in claim 1.

14. A method for manufacturing a refractive optical component as claimed in claim 1, the method comprising:
  providing a device for additive manufacturing of the main body from a transparent material,
  providing construction data of the main body to be manufactured having the front side, the back side, and the principal axis perpendicular to at least one of the front side or the back side, and
    having the plurality of optical layers extending between the front side and the back side and each optical layer having the thickness in the direction parallel to the principal axis,
    wherein each of the optical layers extends over the common region being common to all the optical layers in the directions perpendicular to the principal axis, the common region being greater than the maximum thickness of the respective optical layer by at least a factor of 10,
  wherein the thicknesses of the optical layers vary over the extent thereof transversely to the principal axis, and
  wherein the thicknesses of the optical layers are in the range of 1 μm to 100 μm;
  providing a carrier; and
  progressively applying the transparent material to the carrier in accordance with the construction data provided,
    wherein the optical layers are applied one on top of another, and
    wherein the number of the optical layers is constant over the extent of the optical component transversely to the principal axis.

15. The method as claimed in claim 14, wherein the number of optical layers is at least 50.

* * * * *

UNITED STATES PATENT AND TRADEMARK OFFICE
CERTIFICATE OF CORRECTION

| | |
|---|---|
| PATENT NO. | : 11,279,104 B2 |
| APPLICATION NO. | : 17/398435 |
| DATED | : March 22, 2022 |
| INVENTOR(S) | : Michael Totzeck and Markus Haidl |

It is certified that error appears in the above-identified patent and that said Letters Patent is hereby corrected as shown below:

On the Title Page

Item (54) and in the Specification, Column 1, Lines 1-8, Title, change "REFRACTIVE OPTICAL COMPONENT AND SPECTACLE LENS PRODUCED THEREFROM, METHOD FOR PRODUCING A REFRACTIVE OPTICAL COMPONENT, COMPUTER PROGRAM PRODUCT, CONSTRUCTION DATA OF A SPECTACLE LENS STORED ON A DATA MEDIUM, DEVICE FOR ADDITIVE" to -- REFRACTIVE OPTICAL COMPONENT AND SPECTACLE LENS PRODUCED THEREFROM, METHOD FOR PRODUCING A REFRACTIVE OPTICAL COMPONENT, COMPUTER PROGRAM PRODUCT, CONSTRUCTION DATA OF A SPECTACLE LENS STORED ON A DATA MEDIUM, DEVICE FOR ADDITIVE MANUFACTURING OF A MAIN BODY, AND SPECTACLE LENS --

In the Specification

Column 10, Line 65, change "climax" to -- $di_{max}$ --

Column 18, Line 34, change "climax" to -- $di_{max}$ --

Signed and Sealed this
Seventh Day of June, 2022

Katherine Kelly Vidal
*Director of the United States Patent and Trademark Office*